Aug. 9, 1960  C. H. INGWER ET AL  2,948,326
FLARING TOOL
Filed May 31, 1957  2 Sheets-Sheet 2

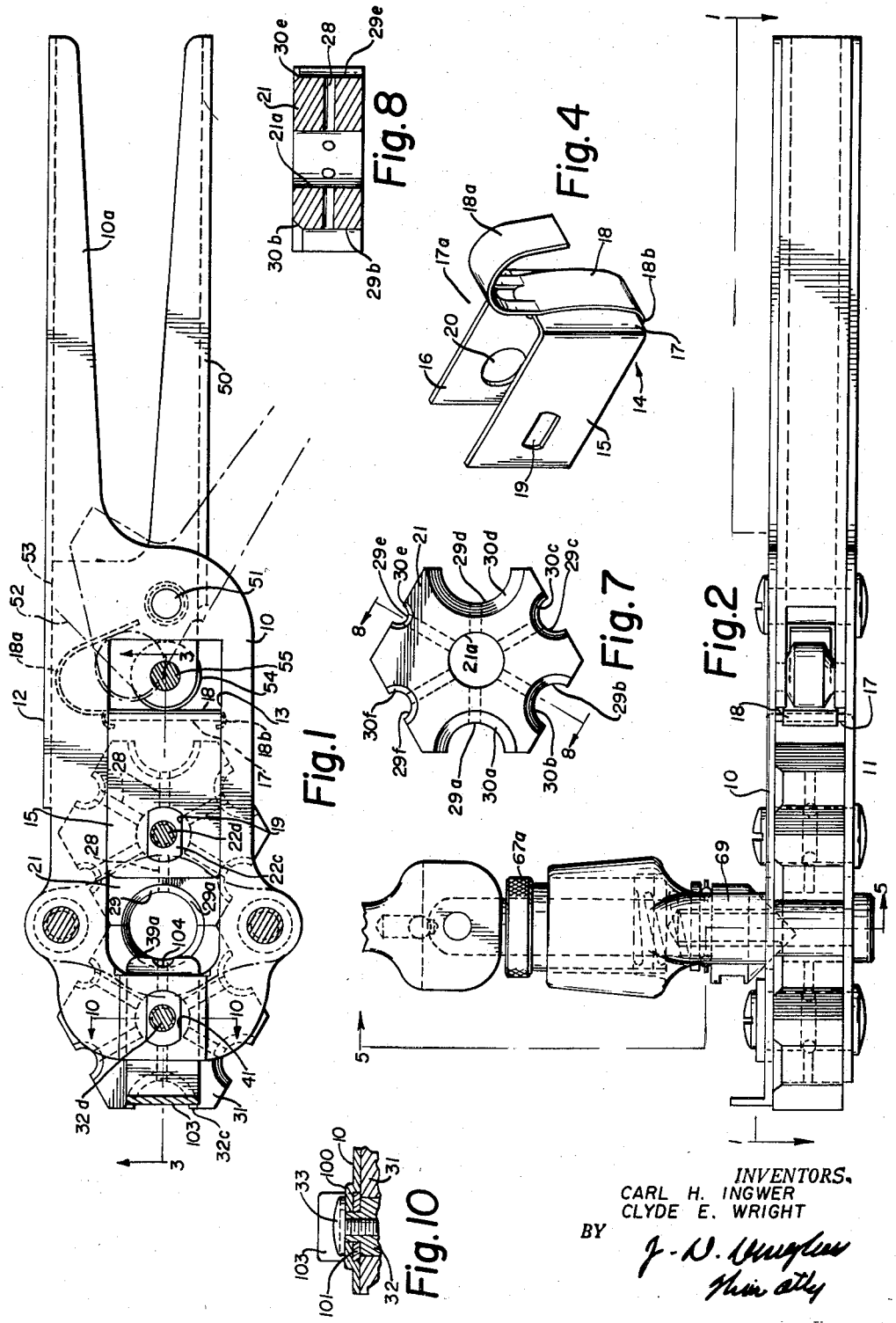

INVENTORS.
CARL H. INGWER
CLYDE E. WRIGHT.
BY

United States Patent Office 2,948,326
Patented Aug. 9, 1960

2,948,326

FLARING TOOL

Carl H. Ingwer and Clyde E. Wright, Elyria, Ohio, assignors to The Ridge Tool Company, Elyria, Ohio Filed May 31, 1957, Ser. No. 662,789

2 Claims. (Cl. 153—79)

This invention relates to a tool for flaring the end of a tube.

The widespread use of copper tubing for household plumbing and similar applications has accentuated the need for a flaring tool which may be operated conveniently by one man. Previous tools for this general purpose often were so constructed that it took two men to operate the tool. In addition, many such tools exerted excessive endwise force on the tube, causing the end of the tube to be split as a result of the flaring operation. Also, such tools commonly had corrugated clamping jaws for holding the tube in place during the flaring operation and not infrequently the tube was damaged by the corrugations on the clamping jaws.

The present invention is directed to a flaring tool which avoids these disadvantages and which is capable of more convenient and effective operation than previous tools of this general type.

Accordingly, it is an object of this invention to provide a novel and improved flaring tool.

It is also an object of this invention to provide a novel flaring tool of novel construction which enables the tool to be operated conveniently by one man.

Another object of this invention is to provide a novel flaring tool having adjustable clamping jaws for selectively accommodating various sized tubes wherein the mechanism for operating the clamping jaws is of improved construction which minimizes the problem of manufacturing tolerances.

A further object of this invention is to provide a novel flaring tool having novel provision for carrying out the tube flaring operation.

Other objects and advantages of this invention will be apparent from the following detailed description of a preferred embodiment thereof, which is illustrated in the accompanying drawings.

In the drawings:

Figure 1 is a top view of the tube clamping portion of the present tool, taken along the line 1—1 in Fig. 2;

Figure 2 is an elevational view of the present tool with the upper end of the crank removed;

Figure 4 is a perspective view of the spring coupling which acts between one of the clamping jaws and the handle for adjusting that jaw in the present tool;

Figure 7 is a top view of one of the clamping jaws in the present tool;

Figure 8 is a section along the line 8—8 in Fig. 7;

Figure 10 is a section along the line 10—10 in Fig. 1.

Figure 3:
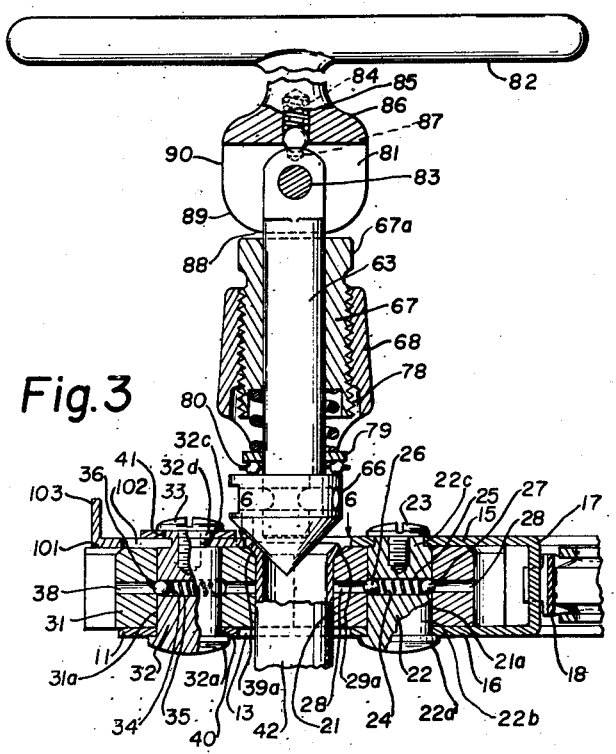
Figure 3 is a fragmetary vertical section through present tool, taken along the line 3—3 in Figure 1, with the flaring element of the tool engaging the tube held by the clamping jaws.

Referring to Figs. 1 and 2, the present tool includes a rigid fixed frame having a top plate 10, a bottom plate 11 spaced below the top plate and extending parallel thereto, and a side 12 which interconnects the top and bottom plates. The top and bottom plates have elongated extensions 10a and 11a which are interconnected by the side 12 and which define therewith a channel-shaped handle.

The top plate 10 is formed with a generally rectangular, oblong opening 13. An identical opening is formed in the bottom plate 11 directly beneath the opening 13. A U-shaped support member 14 (Fig. 4) has a rectangular upper leg 15 snugly, but slidably, received in the opening 13 in top plate 10, a similar lower leg 16 similarly received in the corresponding opening in bottom plate 11, and a bridging wall 17 which interconnects the upper and lower legs 15 and 16. A leaf spring 18 extends across the bridging wall 17 of the support member and is bent over the edges of the support member, as best seen in Fig. 1. The spring 18 is bowed outwardly from the bridging wall 17 of the support member. At one end the spring 18 terminates in a hook-shaped segment 18a which extends away from the support member 14.

The upper leg 15 of support member 14 is formed with an oblong opening 19 while the lower leg has a similarly positioned circular opening 20. A first clamping jaw member 21, which is generally hexagonal in outline, is rotatably mounted on support 14 by means of a pin indicated generally by the reference numeral 22. Referring to Fig. 3, pin 22 has a head 22a on its lower end engaging the underside of the bottom leg 16 on support 14, a circular stem portion 22b extending snugly up through the opening 20 in that leg of the support and through a circuit central bore 21a in the clamping member 21, and a reduced oblong segment 22c snugly and non-rotatably received in the opening 19 in the upper leg 15 of the support. A screw 23 is threaded into the upper end of pin 22 and clamps the pin in place on support 14, as shown in Fig. 3.

At its middle the pin 22 is formed with a transverse bore 24 receiving a compression coil spring 25 and balls 26, 27 engaging the opposite ends of the spring. The clamping member 21 is formed with six radial passages 28 which are slightly smaller than the balls 26, 27. The coil spring 25 is under compression between balls 26, 27 and biases these balls radially outward into the inner ends of an opposite pair of the passages 28. This provides a frictional interlock between pin 22 and clamping member 21, which may be overcome manually when it is desired to adjust clamping member 21 to a new angular position.

As best seen in Fig. 7, at each of its six outer faces the clamping member 21 presents a semi-circular recess. These recesses 29a–29f are of different sizes to accommodate tubing of various sizes. At their upper ends the semi-circular recesses 29a–29f are formed with outwardly beveled faces 30a–30f, respectively, which extend at 45° to the vertical. These beveled faces are the surfaces against which the end of the tube is forced to produce a flare on that end of the tube. Each of the beveled faces 30a–30f has a different depth than the other, depending upon the size of the tube to be received in the corresponding semicircular recess 29a–29f in the clamping member. The larger the recess the deeper the beveled face. Because of this advantageous construction, the large diameter tubes, which are thicker, are formed with deeper flares on the end, thereby facilitating their connection to the unflared ends of similar tubing in the usual manner.

A second clamping member 31, identical to the first, is rotatably mounted between the top and bottom plates 10, 11 of the frame at the end of the frame remote from the handle. The second clamping member 31 is rotatably mounted on a pin 32 having a head 32a on its lower end engaging the underside of the bottom wall 11 of the frame. A circular stem portion 32b of the pin extends up through a complementary circular opening 40 in the bottom wall of the frame and through a circular central bore 31a in the clamping member 31. At its upper end the circular stem portion 32b is joined to a reduced neck 32c, whose upper end is connected to an oblong segment 32d, which is snugly and non-rotatably received in a complementary opening 41 in the top wall 10 of the frame. A screw 33 is threaded into the upper end of pin 32 and clamps the pin in place on the frame, as best seen in Fig. 3.

At its middle the pin 32 is formed with a transverse bore 34 which receives a compression coil spring 35 and balls 36, 37 engaging the opposite ends of the spring. The clamping member 31 is formed with six radial passages 38, slightly smaller than the balls 36, 37. Coil spring 35 is under compression between these balls and biases them radially outward into engagement with the inner end of an opposite pair of the passages 38. This provides a frictional interlock between the pin 32 and the second clamping member 31, which may be overcome manually when it is desired to adjust the second clamping member 31 to a new angular position.

At its six outer faces the clamping member 31 provides semi-circular recesses 39a–39f having respective beveled faces 40a–40f. These recesses and beveled faces are identical to those on the first clamping member 21. The two clamping members 21 and 31 may provide any one of six circular openings for receiving the correspondingly sized tubing.

An elongated adjustable handle 50 of channel-shaped cross-section is pivotally mounted on the frame by means of a pin 51. At its inner end the pivoted handle 50 presents a transverse protrusion 52 at one side which terminates in an end face 53, which engages the inner face of the side wall 12 of the frame to limit the movement of handle 50 toward the frame handle 10a, 11a, 12. A roller 54 is rotatably supported on handle 50 by means of a pin 55. The periphery of this roller projects beyond the inner end of handle 50 for engagement with the bowed portion of spring 18 overlying the bridging wall 17 of support 14 for the first clamping member 21. As shown in Fig. 1, the hooked end 18a of spring 18 is positioned to be engaged by the opposite side of roller 54 when the adjustable handle 50 is pivoted clockwise.

When the handle 50 is pivoted clockwise in Fig. 1, it retracts roller 54 away from the bowed portion of spring 18 and into engagement with the hooked end 18a of this spring, thereby positively retracting the support 14 for the first clamping jaw 21 to the right in Fig. 1, releasing the tube 42 held by the jaws 21, 31 and enabling these jaws to be turned to a new angular position, if desired.

After this adjustment has been made and a new tube inserted between the jaws, the handle 50 may be pivoted counterclockwise in Fig. 1. The roller 54 is brought into engagement with bowed portion of spring 18, forcing the holder 14 for the first jaw 21 to the left in Fig. 1 until the tube is tightly clamped between the jaws. Spring 18 forms a spring coupling between the pivoted handle 50 and the holder 14 for the first jaw. This spring coupling is particularly advantageous in that it causes the first jaw 21 to be forced tight against the tube, while at the same time the problem of manufacturing tolerances is minimized since the spring 18 will compensate for any minor dislocation of the parts, such as if the pivot 51 for the handle 50 is not exactly located in its proper position.

Figure 9:
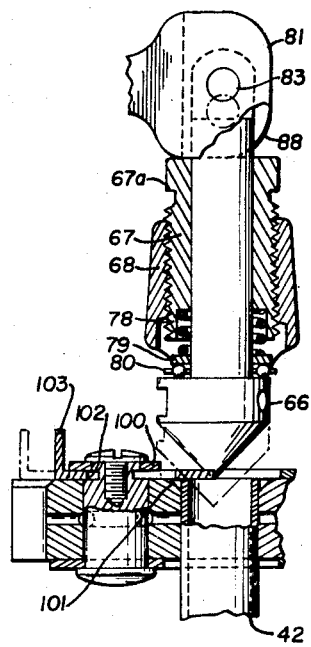
Figure 9 is a fragmentary view similar to Fig. 3 showing the positions of the parts as the flaring element is moved toward engagement with the tube to be flared.

As best seen in Figs. 3, 9 and 10, the top wall 10 of the frame is formed with an upwardly offset segment 100 above the second clamping member 31. This offset segment 100 defines a channel in which is slidably mounted a stop member 101. The stop member is formed with an elongated slot 102 through which extends the reduced neck 32c on pin 32, which supports the second clamping member 31. The stop member 101 thus can slide freely across the top of clamping jaw 31 to the extent permitted by the length of its slot 102. At its outer end the slidable stop member 101 has an upstanding segment 103 which may be engaged by the user's finger to push the stop member inwardly. At its inner end the stop member 101 is formed with an arcuate recess 104 for engagement by the flaring element of the tool, as described in detail hereinafter.

Figure 5:
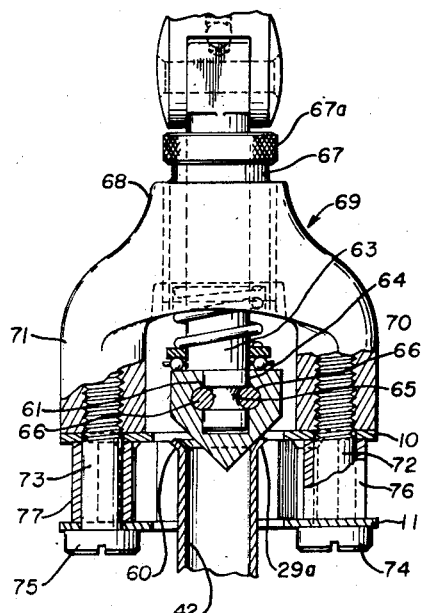
Figure 5 is a view, taken along the line 5—5 in Fig. 2, which shows the mounting for the flaring element in the present tool.
Figure 6:
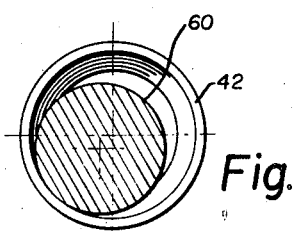
Figure 6 is a sectional view, taken along the line 6—6 in Fig. 3, and showing the engagement of the flaring element with the end of the tube being flared.

Referring to Figs. 2, 3 and 5, the flaring element or mandrel 60 in the present tool has a conical lower end for engagement with the upper end of the tube 42 to be flared. The flaring element is formed with a socket 61, which is open at its upper end. An elongated rod 63 has an offset, reduced diameter extension 64 at its lower end which is received snugly in socket 61. The rod extension 64 is formed with annular groove 65 to accommodate a pair of oppositely disposed locking pins 66 mounted on the flaring element 60. By this arrangement the flaring element 60 is detachably coupled to rod 63 to revolve in translatory fashion in a circle about the longitudinal axis of the rod when the rod is turned. The longitudinal axis of rod 63 coincides with the axis of the tube 42 clamped between the clamping jaws 21, 31.

Rod 63 extends slidably and rotatably up through an axial passage in an externally threaded bearing sleeve 67, which has a knurled head 67a at its upper end. Sleeve 67 is threadedly mounted in the hub portion 68 of a bifurcated yoke 69. Yoke 69 has its opposite legs 70, 71 (Fig. 5) attached to the frame by means of bolts 72, 73. These bolts present enlarged heads 74, 75 at their lower ends which engage the underside of the bottom plate 11 of the frame. The bolts present smooth walled portions extending up through sleeves 76, 77, respectively, located between the top and bottom plates 10, 11 of the frame. At their upper ends the bolts terminate in screw threaded portions threadedly received in the respective legs 70, 71 of the yoke.

A coil spring 78 is under compression between sleeve 67 and a top plate 79 associated with a ball bearing assembly, indicated generally by the numeral 80, on top of the flaring element 60. In this manner, spring 78 acts to force the flaring element 60 down into engagement with the tube 42 to be flared. As shown in Fig. 3, the sleeve 67 at its lower end encircles the upper end of spring 78 and thereby provides a guard for this end of the spring.

At its upper end rod 63 is cut away on opposite sides and is received freely between the depending opposite legs 81 on the bifurcated lower end of a crank 82. A cross pin 83 provides a pivotal connection between the crank 82 and rod 63.

Between its depending legs 81 the crank is formed with a downwardly facing recess 84 which receives a compression coil spring 85. A ball 86 engages the lower end of the spring and is slidable into the recess 84. The upper end of rod 63 is formed with an upwardly facing recess 87 somewhat smaller than the ball. When the crank 82 is positioned as shown in Figs. 2 and 3, the ball 86 seats in recess 87 and provides a coupling between the crank and rod 63 so that turning of the crank about the axis of rod 63 causes the rod to turn with it.

Each lower leg 81 on crank 82 has a flat bottom edge 88. Cam surfaces 89 extend up and outward from this bottom edge 88 at opposite sides of pivot pin 83, these cam surfaces gradually diverging away from the pivot pin 83 and terminating at their upper ends in straight sides 90. These sides 90 are disposed at a greater distance from the pivot pin 83 than the bottom edges 88 and extend perpendicular to those bottom edges.

In the initial position of the parts, crank 82 extends perpendicular to rod 63 and is coupled thereto by the ball and socket coupling 86, 87. Spring 78 forces the rod 63 inward along sleeve 67 and positions the bottom edges 88 of the crank in engagement with the top of sleeve 67.

When crank 82 is pivoted about the pin 83 in either direction, the corresponding cam surfaces 89 first ride across the top of sleeve 67 and then the corresponding sides 90 are brought into engagement with the top of the sleeve as shown in Fig. 9. This pivotal movement of the crank pulls the rod 63 up along sleeve 67 and compresses spring 78 further. Such compression of the spring establishes substantial friction between the top of sleeve 67 and the sides 90 on the crank which engage it.

Because of this friction, when crank 82 is turned about the axis of rod 63 the sleeve 67 turns with it. By turning the crank 82 in the proper direction the sleeve 67 is screwed downward along yoke 69. At the same time the rod 63 and the flaring element 60 attached thereto also move downward in unison with crank 82 and sleeve 67, due to the connection at pin 83 between the crank 82 and rod 63.

When the flaring element 60 engages the upper end of the pipe 42 to be flared, this provides substantial frictional resistance to the continued turning of sleeve 67 in unison with crank 82. As a result, the sides 90 of the crank begin to slip frictionally across the top of sleeve 67 and the sleeve no longer turns with the crank. This occurrence is immediately apparent to the user of the tool and tells him that the flaring element 60 is engaging the end of the tube 42 to be flared, in proper position for the beginning of a flaring operation.

The user now pivots the crank 82 back to its original position, perpendicular to rod 63. This establishes the frictional interlock at ball 86 and socket 87 between crank 82 and rod 63. At this time, the bottom edges 88 of the crank are spaced a slight distance above the top of sleeve 67, as shown in Fig. 3. Now, as the crank 82 is turned about the axis of rod 63 the flaring element 60 moves in translatory fashion about the axis of the rod, which is coincident with the axis of the tube 42 to be flared. The conical lower end of the flaring element 60 rolls across the inner side of tube 42, engaging successive portions of the inner side wall of the tube as the flaring element moves in its orbital path. In this manner, the upper end of the tube is flare dout against the beveled faces of the clamping elements in a gradual, progressive manner which avoids splitting of the tube.

The force exerted on the tube 42 by the flaring element 60 during the flaring operation is determined solely by spring 78. If desired, this spring force may be adjusted simply by turning sleeve 67 so as to apply greater or less compression on the spring.

Operation

In the use of this tool, initially the adjustable handle 50 is positioned away from the fixed handle, and consequently the support 14 and the clamping element 21 which it supports are retracted away from the other clamping element 31. The slidable stop 101 initially is positioned inwardly, to the right as shown in Fig. 9, so that its inner end extends partially across the upper end of the tube receiving space between the clamping elements.

The tube 42 to be flared is inserted up between the clamping elements 31, 21 until its upper end strikes the bottom of the stop 101. This positions the upper end of tube 42 flush with the tops of the clamping jaws 31, 21 and such positioning takes place automatically without requiring the user to do so by visual ovservation. With the tube to be flared in proper position now, the adjustable handle 50 is pivoted toward the fixed handle, thereby forcing the clamping element 21 tightly against the tube 42 to clamp the tube in place.

While the positioning and clamping of the tube 42 have been taking place, as described, the flaring element 60 is in its initial retracted position up away from the upper end of tube 42.

Next, the crank 82 is pivoted about pin 83, bringing its sides 90 into frictional engagement with the top of sleeve 67 due to the compression of spring 78 as a result of such pivoting of crank 82. Crank 82 now is turned about the axis of rod 63, causing sleebe 67 to screw down and also moving the flaring element 60 down toward the upper end of tube 42.

The conical lower end of the flaring element 60 first engages the recess 104 on the inner end of stop 101 (Fig. 9). As the flaring element continues to move down it gradually pushes the stop 101 out of the way. The vary slight resistance offered by the slidable stop 101 does not overcome the coupling between crank 82 and sleeve 67.

However, when the flaring element 60 engages the upper end of tube 42, the resultant frictional resistance to the movement of the flaring element causes the crank 82 to begin to slip across the top of sleeve 67.

Then the operator pivots crank 82 back about pin 83 to the Fig. 3 position. The crank 82 is then turned about the axis of rod 63 to produce the desired flaring operation on the upper end of tube 42.

After the flaring operation is completed, the crank 82 is again pivoted about pin 83 to retract the flaring element slightly up away from the flared end of tube 42. Crank 82 then is turned in the opposite direction and, due to its frictional engagement with the top of sleeve 67, it turns the sleeve 67 back up along the yoke 69 and retracts the rod 63 and flaring element 60 up away from the upper end of tube 42. Then, handle 50 is retracted, counter-clockwise in Fig. 1 to retract the clamping element 21 and thereby release the flared tube 42 from between the clamping elements.

From the foregoing, it will be apparent that the present invention lends itself to convenient operation by one man, at the same time avoiding the difficulties and disadvantages associated with prior tools of this general type.

It is to be understood that, while there has been described in detail herein and illustrated in the accompanying drawings a particular preferred embodiment of the present invention, various modifications, omissions and refinements which depart from the disclosed embodiment may be adopted without departing from the spirit and scope of this invention.

We claim:

1. A flaring tool comprising a base having means for supporting a tube to be flared, a support mounted on said base and having a threaded central opening therein, an externally threaded sleeve threadedly mounted in said opening and having a lengthwise passage, a rod slidably and rotatably received in said passage in the sleeve, a flaring element connected eccentrically to the inner end of said rod for engagement with the end of the tube to be flared, a spring under compression against the sleeve and urging the flaring element toward the tube to be flared, a crank having a pivotal connection to the outer end of the rod, said crank having a portion spaced from the outer end of the sleeve in one position of the handle and movable into engagement with the outer end of the sleeve at one side of said passage therein upon pivotal movement of the crank about its pivotal connection to the rod to a second position, said crank by such pivotal movement retracting the rod outwardly with respect to the sleeve and compressing said spring further, said crank upon being turned about the axis of said rod while in said second position frictionally engaging the outer end of the sleeve due to the compression of the spring and turning the sleeve with it inward along said opening in the support toward the end of the tube to be flared and carrying the rod and the flaring element inward toward said tube until the flaring element engages said tube, and means providing a coupling between the crank and the rod in said one position of the crank for turning the rod about its axis when the handle is turned about the axis of the rod to move the flaring element about the axis of the rod.

2. The cool of claim 1, wherein said coupling means comprises a ball carried by the crank and a spring biasing the ball into engagement with the rod, and a recess in said rod which receives said ball in said one position of the crank to couple the crank and the rod together.

References Cited in the file of this patent

UNITED STATES PATENTS

| | | |
|---|---|---|
| 1,038,913 | Long | Sept. 17, 1912 |
| 1,049,125 | Midgley et al. | Dec. 31, 1912 |
| 1,194,235 | Benbow | June 13, 1933 |
| 1,962,522 | Paterson | June 12, 1934 |
| 1,986,025 | Strecher | Jan. 1, 1935 |
| 2,124,743 | McMahon | July 26, 1938 |
| 2,280,078 | Pettey | Apr. 21, 1942 |
| 2,438,989 | Biltman | Apr. 6, 1948 |
| 2,505,666 | Frank | Apr. 25, 1950 |
| 2,563,088 | Wilks | Aug. 7, 1951 |
| 2,662,575 | Wolcott | Dec. 15, 1953 |
| 2,707,511 | Franck | May 3, 1955 |
| 2,709,474 | Franck | May 31, 1955 |

FOREIGN PATENTS

| | | |
|---|---|---|
| 1,016,338 | France | Aug. 20, 1952 |